(12) United States Patent
Bedro

(10) Patent No.: US 11,833,944 B2
(45) Date of Patent: Dec. 5, 2023

(54) BACK PANEL FOR A VEHICLE SEAT

(71) Applicant: ADIENT ENGINEERING AND IP GMBH, Burscheid (DE)

(72) Inventor: Ronald G. Bedro, Plymouth, MI (US)

(73) Assignee: Adient US LLC, Plymouth, MI (US)

( * ) Notice: Subject to any disclaimer, the term of this patent is extended or adjusted under 35 U.S.C. 154(b) by 469 days.

(21) Appl. No.: 16/967,487

(22) PCT Filed: Feb. 11, 2019

(86) PCT No.: PCT/EP2019/053249
§ 371 (c)(1),
(2) Date: Aug. 5, 2020

(87) PCT Pub. No.: WO2019/155046
PCT Pub. Date: Aug. 15, 2019

(65) Prior Publication Data
US 2021/0213857 A1   Jul. 15, 2021

Related U.S. Application Data

(60) Provisional application No. 62/629,162, filed on Feb. 12, 2018.

(51) Int. Cl.
| | |
|---|---|
| *B60Q 3/233* | (2017.01) |
| *B32B 5/02* | (2006.01) |
| *B32B 5/26* | (2006.01) |
| *B32B 7/12* | (2006.01) |

(Continued)

(52) U.S. Cl.
CPC ............ *B60N 2/5891* (2013.01); *B32B 5/022* (2013.01); *B32B 5/26* (2013.01); *B32B 7/12* (2013.01);

(Continued)

(58) Field of Classification Search
CPC .. B32B 5/022; B32B 5/26; B32B 7/12; B32B 9/025; B32B 9/047; B32B 27/12;
(Continued)

(56) References Cited

U.S. PATENT DOCUMENTS 6,471,276 B1   10/2002   Brunsman et al.
RE42,340 E  *   5/2011   Anderson ................ B60Q 3/30
                                                          362/489

(Continued)

FOREIGN PATENT DOCUMENTS

| CN | 102001199 A | 4/2011 |
|---|---|---|
| CN | 102481978 A | 5/2012 |

(Continued)

OTHER PUBLICATIONS

PCT International Search Report and Written Opinion (PCT/EP2019/053249).

(Continued)

*Primary Examiner* — Michael Zhang
(74) *Attorney, Agent, or Firm* — Marshall & Melhorn, LLC

(57) ABSTRACT

A back panel for a vehicle seat is described. The back panel may have an upper layer, a lower layer supporting the upper layer, an adhesive layer arranged between the upper layer and the lower layer and fixing the upper layer to the lower layer, and at least one additional panel member welded to the lower layer.

9 Claims, 1 Drawing Sheet

(51) Int. Cl.
  *B32B 9/02* (2006.01)
  *B32B 9/04* (2006.01)
  *B32B 27/12* (2006.01)
  *B32B 27/30* (2006.01)
  *B32B 27/40* (2006.01)
  *B60N 2/58* (2006.01)
  *B32B 37/12* (2006.01)
  *B32B 38/00* (2006.01)
  *B32B 38/04* (2006.01)
  *B60N 2/64* (2006.01)

(52) U.S. Cl.
  CPC .............. *B32B 9/025* (2013.01); *B32B 9/047* (2013.01); *B32B 27/12* (2013.01); *B32B 27/304* (2013.01); *B32B 27/40* (2013.01); *B32B 37/12* (2013.01); *B32B 38/0004* (2013.01); *B32B 38/04* (2013.01); *B60N 2/5875* (2013.01); *B60N 2/64* (2013.01); *B60Q 3/233* (2017.02); *B32B 2038/045* (2013.01); *B32B 2605/00* (2013.01)

(58) Field of Classification Search
  CPC ......... B32B 27/304; B32B 27/40; B60N 2/64; B60Q 3/233
  See application file for complete search history.

(56) References Cited

U.S. PATENT DOCUMENTS

| | | | |
|---|---|---|---|
| 2003/0176127 A1* | 9/2003 | McCabe | B32B 7/12 428/36.1 |
| 2009/0085383 A1* | 4/2009 | Hicks | B60R 11/0235 297/217.3 |
| 2011/0053448 A1* | 3/2011 | Hobl | A47C 31/10 428/317.1 |
| 2014/0035342 A1 | 2/2014 | Scholz et al. | |

FOREIGN PATENT DOCUMENTS

| | | | | |
|---|---|---|---|---|
| CN | 106541869 A | 3/2017 | | |
| CN | 111683810 A | 9/2020 | | |
| EP | 1149692 A2 * | 10/2001 | ............ | B32B 27/32 |
| EP | 1170170 A1 | 1/2002 | | |

OTHER PUBLICATIONS

China National Intellectual Property Administration, Office Action in Application No. 201980011765.6, dated Dec. 22, 2021, 8 pages.

* cited by examiner

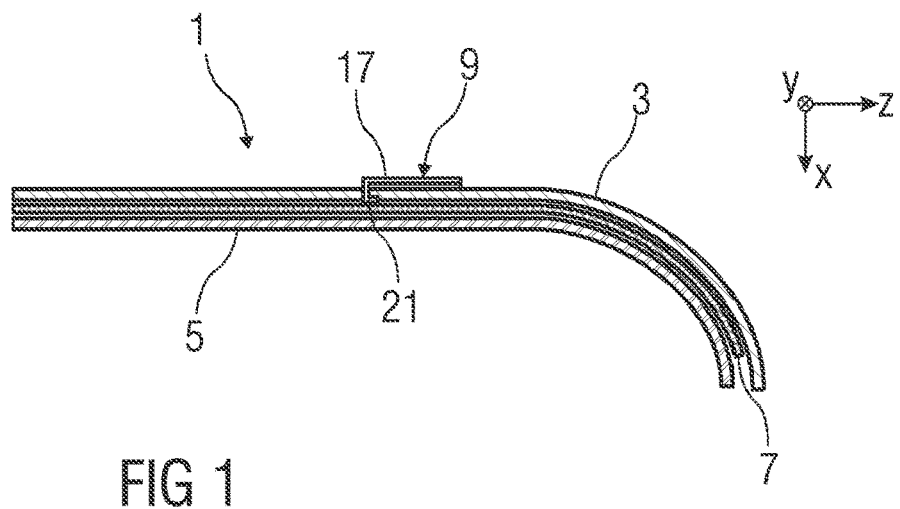
FIG 1
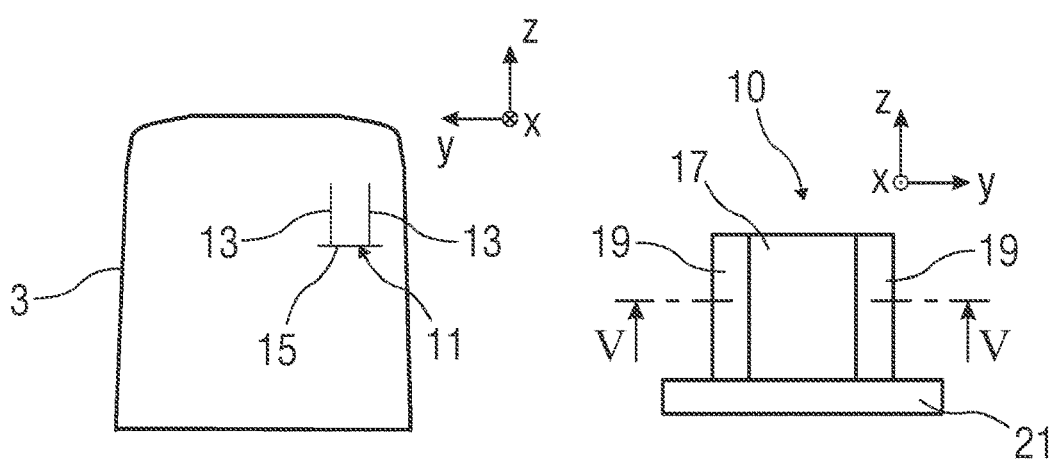
FIG 2
FIG 3
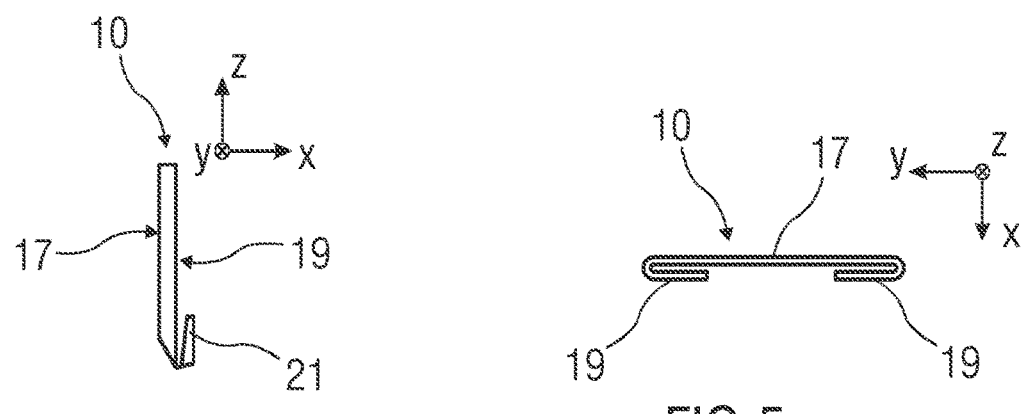
FIG 4
FIG 5

BACK PANEL FOR A VEHICLE SEAT

BACKGROUND OF THE DISCLOSURE

The present disclosure generally relates to vehicle seats, and more particularly to back panels of vehicle seats and manufacturing of back panels of vehicle seats.

Vehicle seats, back panels of vehicle seats, and methods of manufacturing back panels of vehicle seats are generally known in the state of the art.

SUMMARY OF THE DISCLOSURE

It is an object of the present disclosure to provide an improved back panel for a vehicle seat, and a method of manufacturing such a back panel.

According to the disclosure, the object is solved concerning the back panel by the features of claim 1 and concerning the method of manufacturing by the features of claim 9.

A back panel for a vehicle seat according to the invention comprises an upper layer, a lower layer supporting the upper layer, an adhesive layer arranged between the upper layer and the lower layer and fixing the upper layer to the lower layer, and at least one additional panel member welded to the lower layer.

A method of manufacturing a back panel for a vehicle seat according to the invention comprises the steps of:
producing at least one recess or cut out in an upper layer material, for instance by cutting or slitting the upper layer material;
placing in a tool a stack formed of a lower layer material, an adhesive, the upper layer material and at least one additional panel member material, with the adhesive placed between the upper layer material and the lower layer material, and each additional panel member material penetrating at least one recess or cut out in the upper layer material and touching the adhesive; and
welding the stack to form a one piece back panel comprising a lower layer, an adhesive layer, an upper layer and at least one additional member.

For instance, an additional panel member may be a pocket such as a storage pocket, a source of light which may be embedded in an additional panel member material, or may be made of a material differing from the upper layer material, or may constitute a design feature. As the additional panel member is integrated into the back panel when manufacturing the back panel by welding, no manual, labor intensive process is required to attach an additional panel member to the back panel by sewing or other attachment methods.

The upper layer material may be polyvinyl chloride or thermoplastic polyurethane or leather or textile. All these materials can provide an upper layer with appropriate elasticity and comfortable haptic features.

The lower layer may be made of a non-woven material. Woven materials have anisotropic distension features which make them inappropriate lower layer materials.

A vehicle seat according to the invention comprises a back panel according to the invention.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein:

FIG. 1 shows a sectional view of a back panel for a vehicle seat,

FIG. 2 shows a front view of an upper layer of the back panel,

FIG. 3 shows a rear view of a panel member material,

FIG. 4 shows a side view of the panel member material,

FIG. 5 shows a sectional view of the panel member material.

Corresponding parts are marked with the same reference symbols in all figures.

DETAILED DESCRIPTION OF PREFERRED EMBODIMENTS

FIG. 1 shows a sectional view of an embodiment of a back panel 1 for a vehicle seat.

The back panel 1 comprises an upper layer 3, a lower layer 5, an adhesive layer 7 and an additional panel member 9 which provides the back panel 1 with a pocket.

The adhesive layer 7 is arranged between a rear surface of the upper layer 3 and a front surface of the lower layer 5 and fixes the upper layer 3 to the lower layer 5.

The upper layer 3 is made of polyvinyl chloride or thermoplastic polyurethane or leather or textile.

The lower layer 5 is made of a non-woven material.

FIG. 2 shows a front view of the upper layer 3. The upper layer 3 has a recess 11. The recess 11 has the form of an upside down Greek letter π, with two vertical slots 13 and a horizontal slot 15.

FIGS. 3 to 5 show a rear view, side view and sectional view of the panel member material 10, respectively. The panel member material 10 has a front portion 17, two side flaps 19 extending from opposite sides of the front portion 17, and a bottom flap 21 extending from a bottom of the front portion 17. The side flaps 19 and the bottom flap 21 are foldable to a rear surface of the front portion 17.

Each side flap 19 penetrates one of the vertical slots 13 in the upper layer 3 and is folded onto the rear surface of the upper layer 3 towards the other side flap 19. The bottom flap 21 penetrates the horizontal slot 15 in the upper layer 3 and is folded onto the rear surface of the upper layer 3 and the side flaps 19.

The back panel 1 is manufactured in the following way.

The recess 11 is cut or slit in an upper layer material.

Afterwards a stack formed of a lower layer material, an adhesive, the upper layer material and the panel member material 10 is placed in a tool, with the adhesive placed between the upper layer material and the lower layer material, and the flaps 19, 21 of the panel member material 10 penetrating the slots 13, 15 of the recess 11 in the upper layer material as described above and touching the adhesive.

Finally the stack is welded to form a one piece back panel 1 comprising the lower layer 5, the adhesive layer 7, the upper layer 3 and the panel member 9.

LIST OF REFERENCES 1 back panel
3 upper layer
5 lower layer
7 adhesive layer
9 panel member
10 panel member material
11 recess
13 vertical slot
15 horizontal slot
17 front portion 19 side flap
21 bottom flap
x, y, z Cartesian coordinate

The invention claimed is:

1. A back panel for a vehicle seat, the back panel comprising:
   an upper layer;
   a lower layer supporting the upper layer;
   an adhesive layer arranged between the upper layer and the lower layer and fixing the upper layer to the lower layer; and
   at least one additional panel member welded to the lower layer,
   wherein the upper layer is made of polyvinyl chloride or thermoplastic polyurethane or leather or textile,
   wherein the lower layer is made of a non-woven material,
   wherein the lower layer, the adhesive layer, the upper layer and the at least one additional panel member are welded into a stack to form a one piece back panel;
   wherein the additional panel member has a bottom flap that penetrates through the upper layer so that the flap touches the adhesive layer.

2. The back panel of claim 1, wherein the at least one additional panel member comprises a pocket.

3. The back panel of claim 2, wherein the at least one additional panel member comprises a source of light.

4. The back panel of claim 1, wherein the at least one additional panel member is made of a material differing from the upper layer material.

5. The back panel of claim 1, wherein the at least one additional panel member is a design feature.

6. The back panel of claim 1, wherein the upper layer has two vertical slots adapted to receive slide flaps from the additional panel member.

7. The back panel of claim 1, wherein the upper layer has a horizontal slot adapted to receive the bottom flap.

8. The back panel of claim 1, wherein the additional panel member has a front portion and a back portion, wherein the back portion is in direct facing contact with the rear surface of the upper layer.

9. The back panel of claim 8, wherein the additional panel member has side flaps that at least partially overlap the front portion of the additional panel member.

* * * * *